T. E. MURRAY.
METAL VEHICLE WHEEL.
APPLICATION FILED NOV. 17, 1915.
1,212,800.
Patented Jan. 16, 1917.
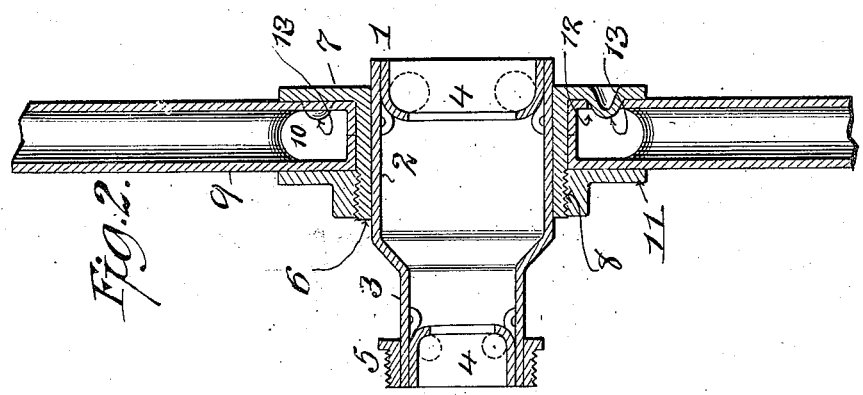
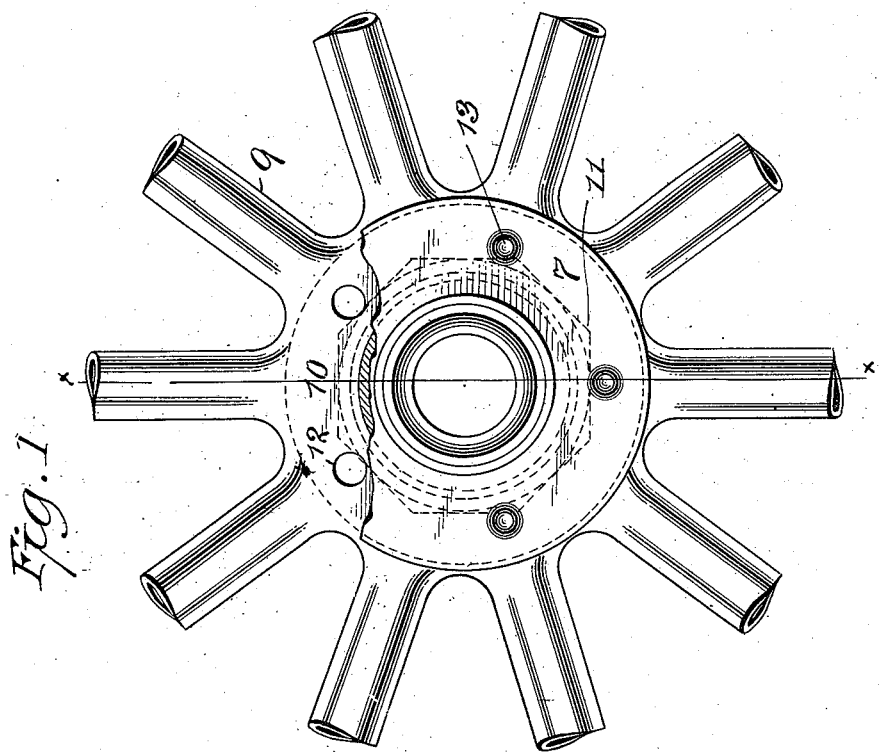
Inventor
Thomas E. Murray
By his Attorney

UNITED STATES PATENT OFFICE.

THOMAS E. MURRAY, OF NEW YORK, N. Y.

METAL VEHICLE-WHEEL.

1,212,800.  Specification of Letters Patent.  Patented Jan. 16, 1917.

Application filed November 17, 1915. Serial No. 61,894.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to metal vehicle wheels, and consists more particularly in the construction whereby the wheel is rendered demountable from the hub.

The object is to simplify and cheapen the wheel so as to render it both economical and easy in case of injury to rim or tire to demount the entire wheel and substitute a new one instead of demounting the tire only or the tire and rim together. The construction is also such as to render the invention applicable to ordinary hollow cylindrical hubs without requiring any change in said hubs.

In the accompanying drawings—Figure 1 is a face view of the hub and a portion of the spokes of my wheel. Fig. 2 is a section on the line $x, x$ of Fig. 1.

Similar numbers of reference indicate like parts.

The hub 1 is of known form and has a cylindrical portion 2 and a contracted portion 3 receiving ball-bearing runways 4. The portion 3 carries a threaded sleeve 5, to which the axle cap (not shown) is applied. The cylindrical portion 2 is preferably reinforced by a sleeve 6 homogeneously united thereto by welding. Said sleeve has a flange 7, and is threaded at 8.

The wheel is formed of tubular metal spokes 9, preferably homogeneously united to an annular nave portion 10 which is closed on its inner periphery. Said nave portion fits upon the sleeve 6. The outer ends of the spokes are connected in any suitable way to the rim, not here shown. The nave portion 10 when in place bears against the flange 7, and is retained by the nut 11 engaging with the threaded portion 8 of sleeve 6. In order to prevent rotation of the wheel upon the hub, I provide a number of openings 12 in the rear wall of nave 10, and on flange 7, I provide studs 13 which enter said openings. This construction affords a very simple demountable wheel, since it is only necessary to remove the nut 11 and slide the annular nave 10 outwardly from the hub. A new wheel of the same kind can then easily be substituted and the nut 11 replaced.

I claim:

1. A demountable metal wheel for vehicles having a hollow sheet metal body, comprising a nave with openings in its rear wall and tubular spokes on said nave, a hub receiving said wheel body, a flange on said hub, studs on said flange entering said nave openings, and means for removably securing said wheel body on said hub.

2. A demountable metal wheel for vehicles having a hollow sheet metal body, comprising a nave with openings in its rear wall and tubular spokes on said nave, a hub receiving said wheel body, a flange on said hub, studs integral with said flange entering said nave openings, and means for removably securing said wheel body on said hub.

In testimony whereof I have affixed my signature in presence of two witnesses.

THOMAS E. MURRAY.

Witnesses:
 GERTRUDE T. PORTER,
 MAY T. McGARRY.